United States Patent [19]

Louwagie et al.

[11] Patent Number: 5,594,347

[45] Date of Patent: Jan. 14, 1997

[54] NON-INVASIVE TESTING OF VIDEO SIGNALS WITH A JACK MODULE AND AMPLIFICATION CIRCUIT

[75] Inventors: Dominic J. Louwagie; Steven L. Carolus, both of Eden Prairie; John M. Field, Edina; Daniel J. Murphy, Eden Prairie; Jeffery O. Brown, St. Paul; James D. Dewey, Plymouth, all of Minn.

[73] Assignee: ADC Telecommunications, Inc., Minneapolis, Minn.

[21] Appl. No.: 447,261

[22] Filed: May 22, 1995

[51] Int. Cl.$^6$ .......................... H01R 29/00; H01H 31/02
[52] U.S. Cl. .......................... 324/539; 439/188; 439/579
[58] Field of Search .......................... 324/538, 539, 324/66; 439/188, 578, 579; 333/124, 127

[56] References Cited

U.S. PATENT DOCUMENTS

| | | | |
|---|---|---|---|
| 3,573,704 | 4/1971 | Tarver | 439/579 |
| 4,725,794 | 2/1988 | Barczys | 333/124 |
| 4,749,968 | 6/1988 | Burroughs . | |
| 4,815,104 | 3/1989 | Williams et al. . | |
| 4,840,568 | 6/1989 | Burroughs et al. . | |
| 5,214,673 | 5/1993 | Morganstern et al. . | |
| 5,280,254 | 1/1994 | Hunter et al. | 439/188 |
| 5,328,380 | 7/1994 | Carney | 439/188 |
| 5,348,491 | 9/1994 | Louwagie et al. . | |
| 5,385,490 | 1/1995 | Demeter et al. | 439/579 |
| 5,413,494 | 5/1995 | Dewey et al. . | |
| 5,482,469 | 1/1996 | Seiceanu et al. | 439/188 |
| 5,513,999 | 5/1996 | Fry et al. | 439/188 |

FOREIGN PATENT DOCUMENTS

PCT/US92/
05880  10/1989  WIPO .

*Primary Examiner*—Maura K. Regan
*Attorney, Agent, or Firm*—Merchant, Gould, Smith, Edell, Welter & Schmidt

[57] ABSTRACT

A non-invasive testing system for video signals includes a jack having a monitor conductor connected across an amplification circuit to a central conductor. The amplification circuit amplifies the power of a signal drawn off of the central conductor such that the power level at the monitor conductor is substantially equal to the power level on the central conductor. When it is desired to test a power level of a signal being produced by a video source, test equipment is connected to the monitor conductor to permit non-invasive testing of the signal.

2 Claims, 10 Drawing Sheets

5,594,347

NON-INVASIVE TESTING OF VIDEO SIGNALS WITH A JACK MODULE AND AMPLIFICATION CIRCUIT

CROSS-REFERENCE TO RELATED APPLICATIONS

The present application discloses and claims subject matter disclosed in commonly assigned and copending U.S. patent application Ser. No. 08/447,062 filed concurrently herewith in the names of the same inventors as the present application and entitled "Switching Coax Jack With Amplified Monitor".

BACKGROUND OF THE INVENTION

1. Field of the Invention

This invention pertains to testing of power levels on video signal lines. More particularly, this invention pertains to a non-invasive system for such testing.

2. Description of the Prior Art

In certain industries, such as the video transmission industry, signals are directed from a source along a coaxial cable. For example, in the cable TV industry, video signals may be collected at a facility by satellite receivers. The signals will be transmitted across coax cables at a base band level. From time to time, it is desirable to monitor the signals in order to set power levels. In fact, industry and government regulations require that certain power levels be maintained in cable TV signals.

In order to test the power level of cable TV signals coming from a source, the signal must be routed to test equipment. Such equipment requires that the signal coming into the test equipment is at the same power level as the signal coming from the source equipment. A reduction in the power of the signal coming into the test equipment will result in unreliable testing of the signal by the test equipment.

Prior art switching coax jacks with monitors (such as U.S. Pat. No. 4,749,968 to Burroughs) were not adequate for permitting access to the signal for testing purposes. For example, with a prior art switching coax jack, a signal could not be drawn off a monitor port and then tested at the test equipment since the signal at the monitor port is reduced in power relative to the signal coming into the jack. As a result, reliable testing off the monitor port was not possible.

With switching coax jacks of the prior art, a plug could be inserted into the OUT port of the jack to divert the entire signal to the test equipment. However, such a system would require interrupting service to a customer.

In present CATV installations, when it is desired to test the power level of a signal, the entire signal is commonly diverted to the test equipment. This results in interrupting the service to a customer. Accordingly, testing of power in CATV installations is typically done during off-peak hours (such as 2 a.m.). This requires having testing technicians available on site outside of normal business hours for the purpose of testing signals. In addition to being disruptive to the scheduling of technicians, such requirements may also be expensive since they may require payment of premium wages to technicians to work during such off-peak hours.

SUMMARY OF THE INVENTION

A signal transmission network is disclosed having a non-invasive testing system. The testing system includes a plurality of jacks each having a monitor conductor connected across an amplification circuit to a central conductor. The amplification circuit is selected for the power level at the monitoring conductor to be substantially equal to the power level on the central conductor. In the testing system, each source of a signal is provided with an individual one of the aforementioned jacks. When it is desired to monitor a power level, a jack plug connected to a testing equipment is inserted and connected to the monitor conductor.

DESCRIPTION OF THE PREFERRED EMBODIMENT

Referring now to the several drawing figures in which identical elements are numbered identically throughout, a description of the preferred embodiment of the present invention will now be provided.

Figure 1:
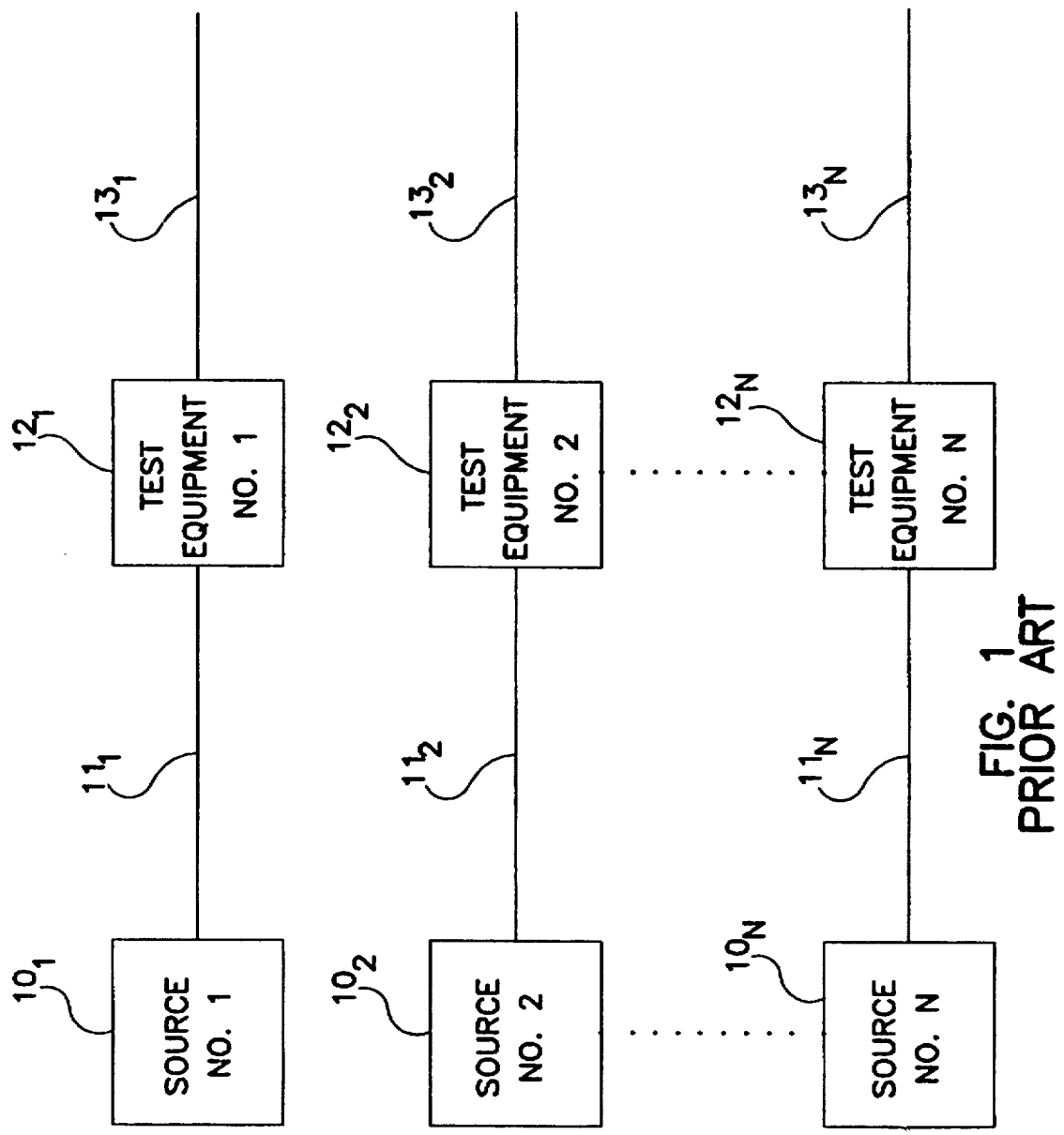
FIG. 1 is a schematic representation of a CATV installation with test equipment for monitoring power of a signal with a prior art testing set-up.

With initial reference to FIG. 1, a prior art CATV installation is shown which draws signals from a plurality of sources $10_1$, $10_2$ through $10_n$ (such as satellite receivers or the like). The signals from the sources $10_1$–$10_n$ are sent along individual coaxial cables $11_1$–$11_n$ to individual test equipment $12_1$–$12_n$. The signal from the test equipment is then sent along coaxial cables $13_1$–$13_n$ to further equipment for distribution to CATV subscribers.

With the installation as shown in FIG. 1, the test equipment $12_1$–$12_n$ can continuously monitor the power of the signals on the cables $11_1$–$11_n$ to ensure that the power of the CATV signal is at a desired or minimum level. This monitoring is done without interruption of service to any customer. However, the test equipment $12_1$–$12_n$ is very expensive. Commonly, such equipment may cost $28,000 per test equipment.

Since a typical CATV installation may have as many as 200 to 300 channels, providing a separate piece of test equipment such as equipment $12_1$–$12_n$ for each line or channel would be prohibitively expensive. Therefore, CATV installations do not provide continuous monitoring of power levels as would be available in the schematic of FIG. 1. Instead, when it is desired to monitor a signal, the signal is routed away from the subscriber and to a single piece of test equipment.

Figure 2:
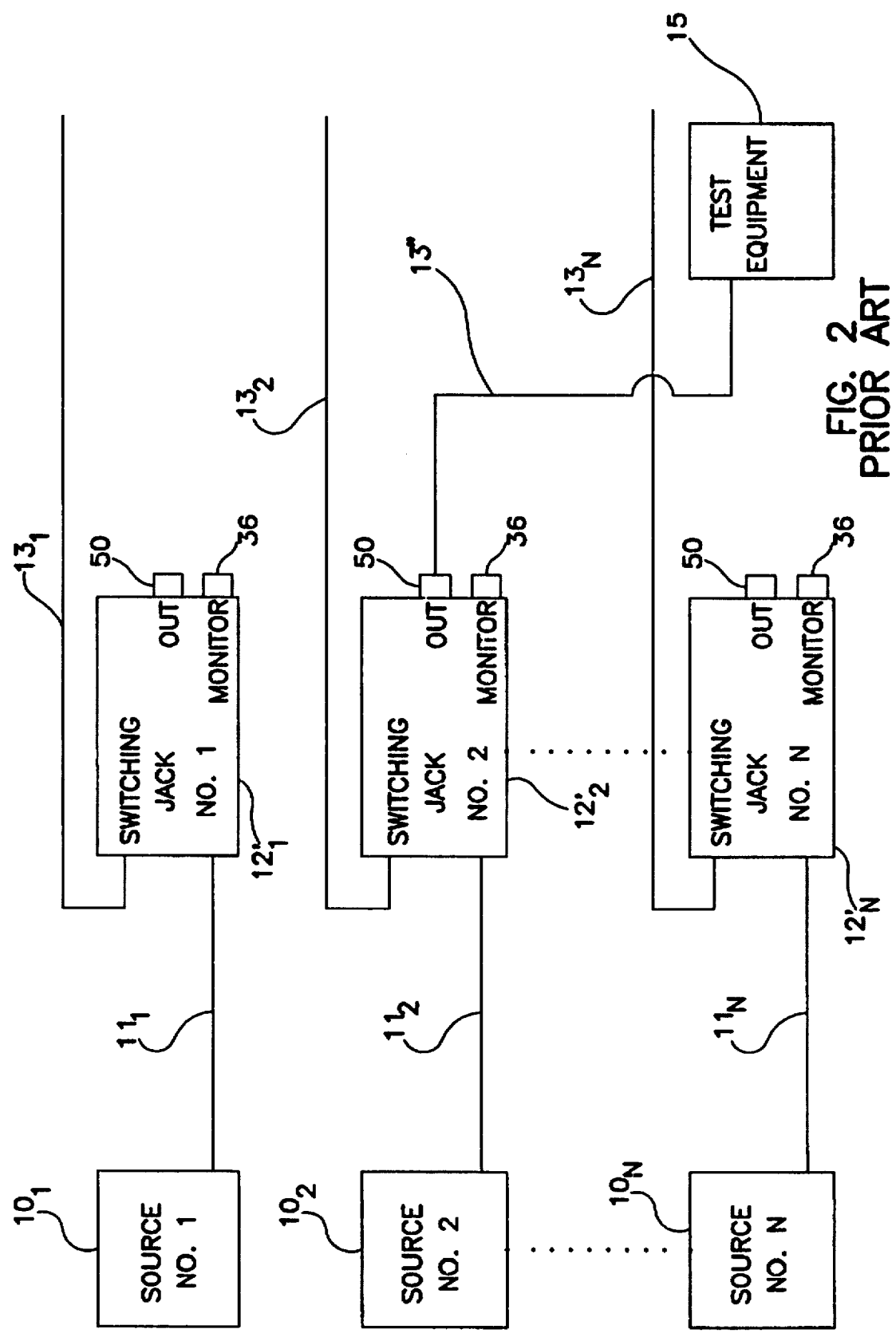
FIG. 2 is a schematic of the CATV system of FIG. 1 with an alternative prior art testing set-up.

FIG. 2 shows an alternative prior art test system. In FIG. 2, the individual test equipments $12_1$–$12_n$ of FIG. 1 have been replaced with individual switching jacks $12'_1$–$12'_n$ such as jacks 20 in the aforementioned U.S. Pat. No. 4,747,968 to Burroughs, incorporated herein by reference. With reference to the specifications and drawings (including reference numerals) of U.S. Pat. No. 4,749,968, cables $11_1$–$11_n$ may be connected to a rear connector of the jacks $12'_1$–$12'_n$ for connection to so called "OUT" conductors (shown and numbered as item 149 in FIG. 2 of the '968 patent). Similarly, cables $13_1$–$13_n$ may be connected to a rear connector of jacks $12'_1$–$12'_n$ for connection to so-called "IN" conductors (shown and numbered as item 157 in FIG. 2 of the '968 patent). In the absence of a jack plug inserted into port 50 (shown in FIG. 2 of the present application and similarly shown and numbered in FIG. 2 of the '968 patent), the signal on cables $11_1$–$11_n$ flow unimpeded through jacks $12'_1$–$12'_n$ to cables $13_1$–$13_n$.

When it is desired to test a power level on one of cables $11_1$–$11_n$ (e.g., to test a power level on cable $11_2$), a patch cord 13" (having one end connected to test equipment 15 and a second end terminated at a jack plug not shown) is provided with its jack plug inserted within port 50. Port 50 is associated with a switching circuit (not shown in the present application but shown and discussed as element 156 in U.S. Pat. No. 4,749,968). Upon insertion of the jack plug into port 50, normal connection of cables $11_2$ and $13_2$ through jack $12'_2$ is broken and cable $13_2$ is connected to electrical ground. Simultaneously, the switch circuit redirects signal flow from cable $11_2$ to patch cord 13" and test equipment 15.

When it is desired to test power on a different one of cables $11_1$–$11_n$ (e.g., cable $11_1$), the jack plug of patch cord 13" is removed from port 50 of jack $12'_2$ and inserted into port 50 of jack $12'_1$. This action reestablishes electrical connection between cables $11_2$ and $13_2$ but breaks electrical connection between cables $11_2$ and $13_1$.

The system of FIG. 2 permits testing of signals on any one of lines $11_1$–$11_n$ using only one test equipment 15. However, in testing any cable, the cable must be taken off-line with resulting interruption to a customer.

In order to avoid dissatisfied customers, the disruption of the service occurs during off-peak hours such as early morning hours when subscribers are typically not using their CATV service. While testing on selected equipment during off-peak hours does not result in substantially dissatisfied customers, it does require technicians and the like to be available at the installation during such abnormal hours. Such scheduling of employee hours is both an inconvenience and expensive. Also, it is desirable to avoid any disruption of customer service.

In FIG. 2, jacks $12'_1$–$12'_n$ are shown with monitor ports 36 corresponding to port 36 in FIG. 12 of U.S. Pat. No. 4,749,968. Insertion of a plug in port 36 permits connection to an OUT conductor associated with port 50. The connection is across a resistor to permit monitoring of the signal on cables $11_1$–$11_n$ without interruption of signal flow to cables $13_1$–$13_n$. However, for reasons that will be described, resistive monitoring jacks such as jacks $12'_1$–$12'_n$ (identical to those shown in U.S. Pat. No. 4,749,968) are not suitable for testing cables $11_1$–$11_n$ in CATV applications according to the present invention.

Figure 3:
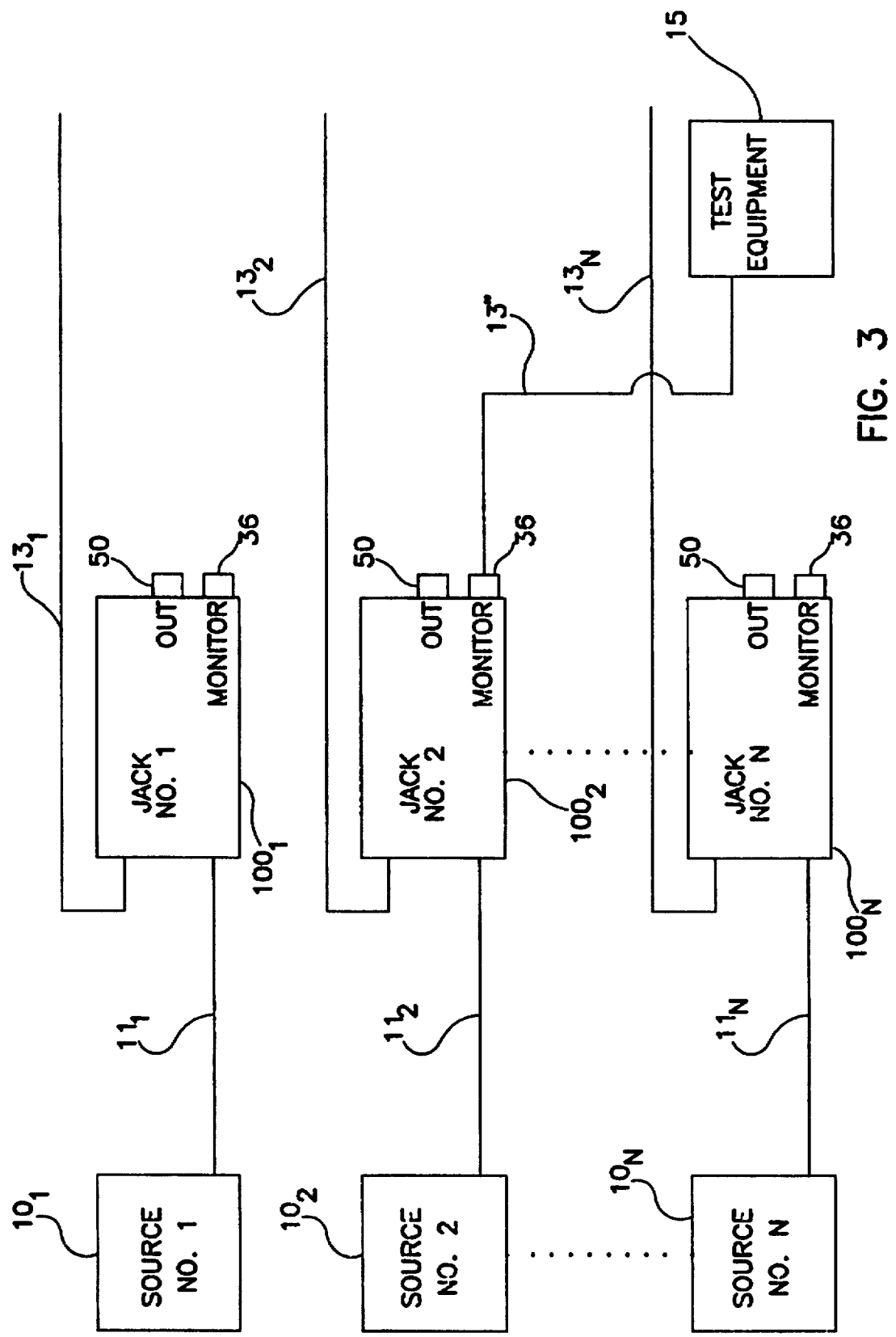
FIG. 3 is a schematic representation of the test system of the present invention.

FIG. 3 illustrates a desired testing installation according to the present invention where the test equipment $12_1$–$12_n$ of FIG. 1 and modules $12'_1$–$12'_n$ of FIG. 2 are replaced by low cost jack modules $100_1$–$100_n$. A single piece of test equipment 15 (as in FIG. 2) is provided to test the power on each of the coaxial cables $11_1$–$11_n$.

When it is desired to route from the modules $100_1$–$100_n$ to the test equipment 15, a patch cord 13" or the like may be connected to test equipment 15 and individually attached to each of the modules $100_1$–$100_n$. However, unlike the system of FIG. 2, the patch cord 13" is not connected to a switched port (i.e., such as port 50 in FIG. 2) but to a monitoring port (such as port 36 in FIG. 2).

Previously, it was indicated that connection of equipment 15 to the monitor ports 36 of jacks $12_1$–$12_n$ in FIG. 2 was undesirable. However, with a novel jack construction, applicants can connect a single test equipment 15 to a monitor port of a jack 100. This has the advantage of permitting testing of signals on cables $11_1$–$11_n$ without breaking connection of the signals to cables $13_1$–$13_n$.

Before proceeding to a detailed discussion of the novel features of jack 100, a more thorough discussion of prior art jacks (such as jacks $12'_1$–$12'_n$) will be provided to assist in an understanding of the present invention.

The prior art includes jacks for coaxial cables which permit monitoring of the signal without interrupting the signal. However, such jacks typically provide a substantial reduction in power by reason of the monitoring. For example, current telecommunications jacks which have a monitoring function commonly produce a $-20$ dB power loss across a resistor to the monitor port of the jack. Jacks $12'_1$–$12'_n$ (i.e., a jack shown in U.S. Pat. No. 4,749,968) are examples of such a jack. Such a power loss is unacceptable since such a reduced power signal cannot be reliably placed in the test equipment 15 for purposes of testing a CATV signal.

Figure 4:
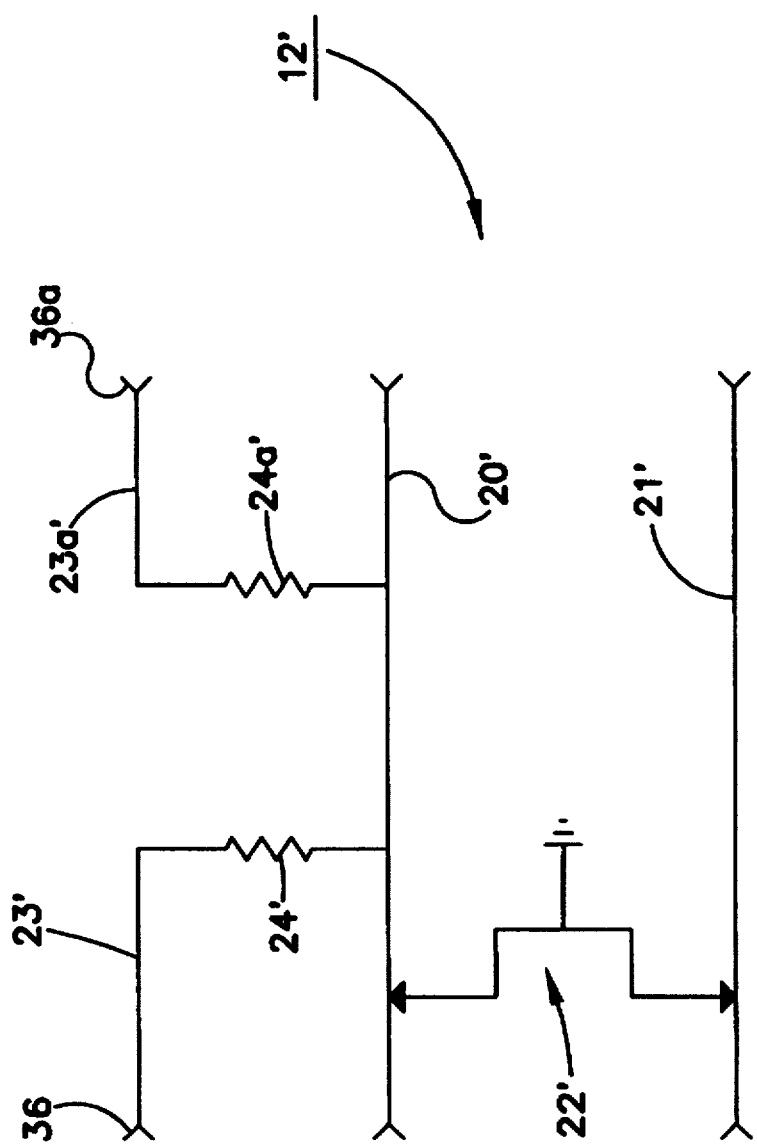
FIG. 4 is a schematic representation of a prior art switching jack having resistive monitoring.

FIG. 4 illustrates in schematic form a prior art switching coax jack 12' such as jacks $12'_1$–$12'_n$ (i.e., the jack and monitor of U.S. Pat. No. 4,749,968). In FIG. 4 the jack 12' is shown with a front monitor 36 and a rear monitor 36a. U.S. Pat. No. 4,749,986 does not show a rear monitor but such are common. Jack 12' includes a first (or OUT) central conductor 20' and a second (or IN) central conductor 21' connected by a switching circuit 22'. Signal flow passes from conductor 20' to conductor 21' through switching circuit 22'. Attachment of a plug to either of conductors 20',21' results in activating the switching circuit 22' and breaking the electrical connection between conductors 20' and 21'. Monitor conductors 23',23a' (associated with ports 36,36a) are connected to conductor 20' across resistors 24',24a'. The resistors 24',24a' (typically about 464 ohms each) permit a portion of the signal on conductor 20' to be passed to the monitor conductors 23',23a' which permits monitoring of the signal on conductor 20'. However, due to the resistive nature of the monitoring, there is a substantial power drop between monitor conductors 23',23a' and the main signal conductor 20'.

Figure 5:
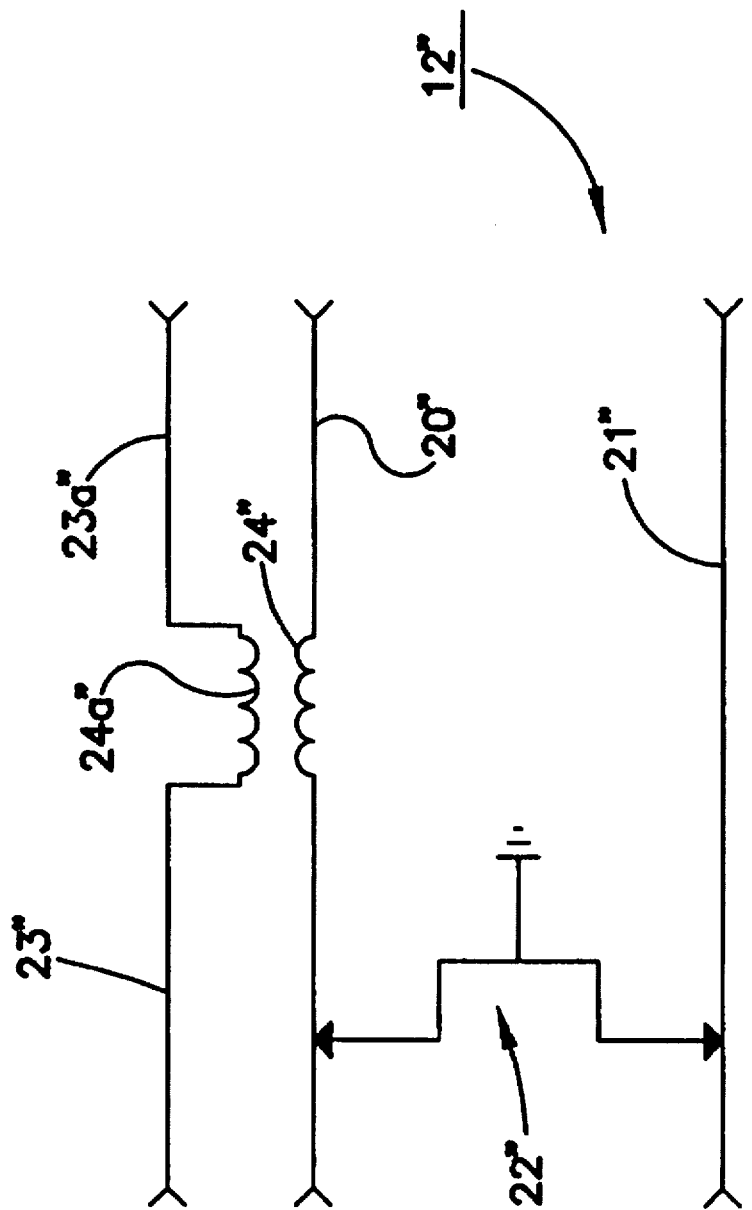
FIG. 5 is a schematic representation of a prior art switching jack having inductive monitoring.

FIG. 5 illustrates a further example of a prior art schematic for monitoring coax jacks. In the jack 12" of FIG. 5, the OUT conductor 20" is connected to IN conductor 21" across a conventional switching circuit 22". Conductor 20" is provided with an inline inductor 24". Monitor conductors 23",23a" are also provided with an inductor 24a" which is inductively coupled to inductor 24". Unlike the resistive monitoring of FIG. 4, the jack 12" of FIG. 5 provides for inductive monitoring. Such a jack is disclosed in U.S. Pat. No. 5,348,491. However, there is still a substantial power loss from conductor 20" to monitor conductors 23",23a" across the inductive coupling of inductors 24",24a".

Figure 6:
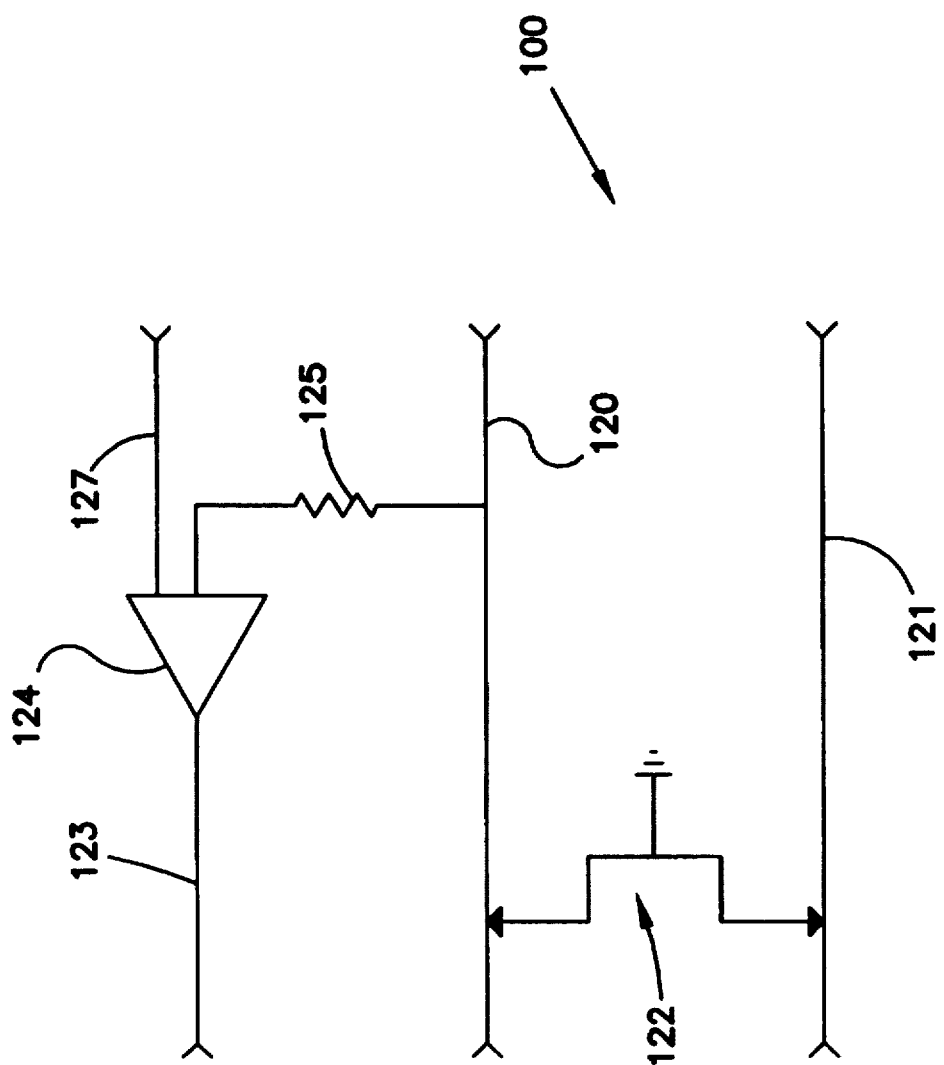
FIG. 6 is a schematic representation of a novel jack for use in the present invention.

The present invention uses an amplified switching coax jack 100 schematically shown in FIG. 6. In the amplified jack 100, a first (or OUT) central conductor 120 is electrically connected to a second (or IN) central conductor 121 across a conventional switching circuit 122. A monitor central conductor 123 is electrically connected to central conductor 120 across an amplification circuit 124.

Amplification circuit 124 is connected to a conductor 120 across a very high resistance resistor 125 so that the portion of signal drawn off conductor 120 does not significantly result in decreased power on conductor 120. A power conductor 127 is provided to power the amplification circuit 124 and is connected to an external source of electrical power.

Through selection of the amplification circuit 124, the power differential between conductors 123,120 may be selected to be any desired power differential. In the present invention for use of the jack for testing CATV signals, it is desirable that there be a zero power differential between conductors 123,120.

Figure 7:
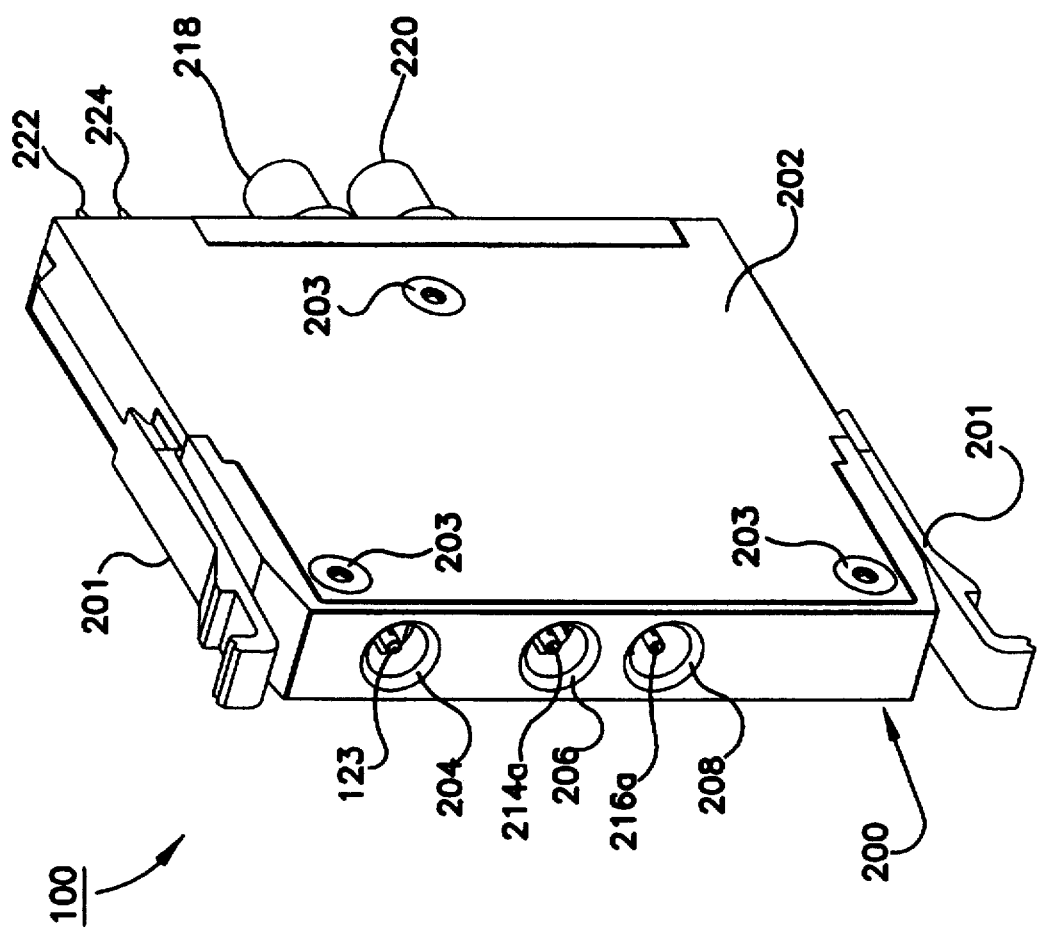
FIG. 7 is a front, right side and top perspective view of the jack of FIG. 6.
Figure 8:
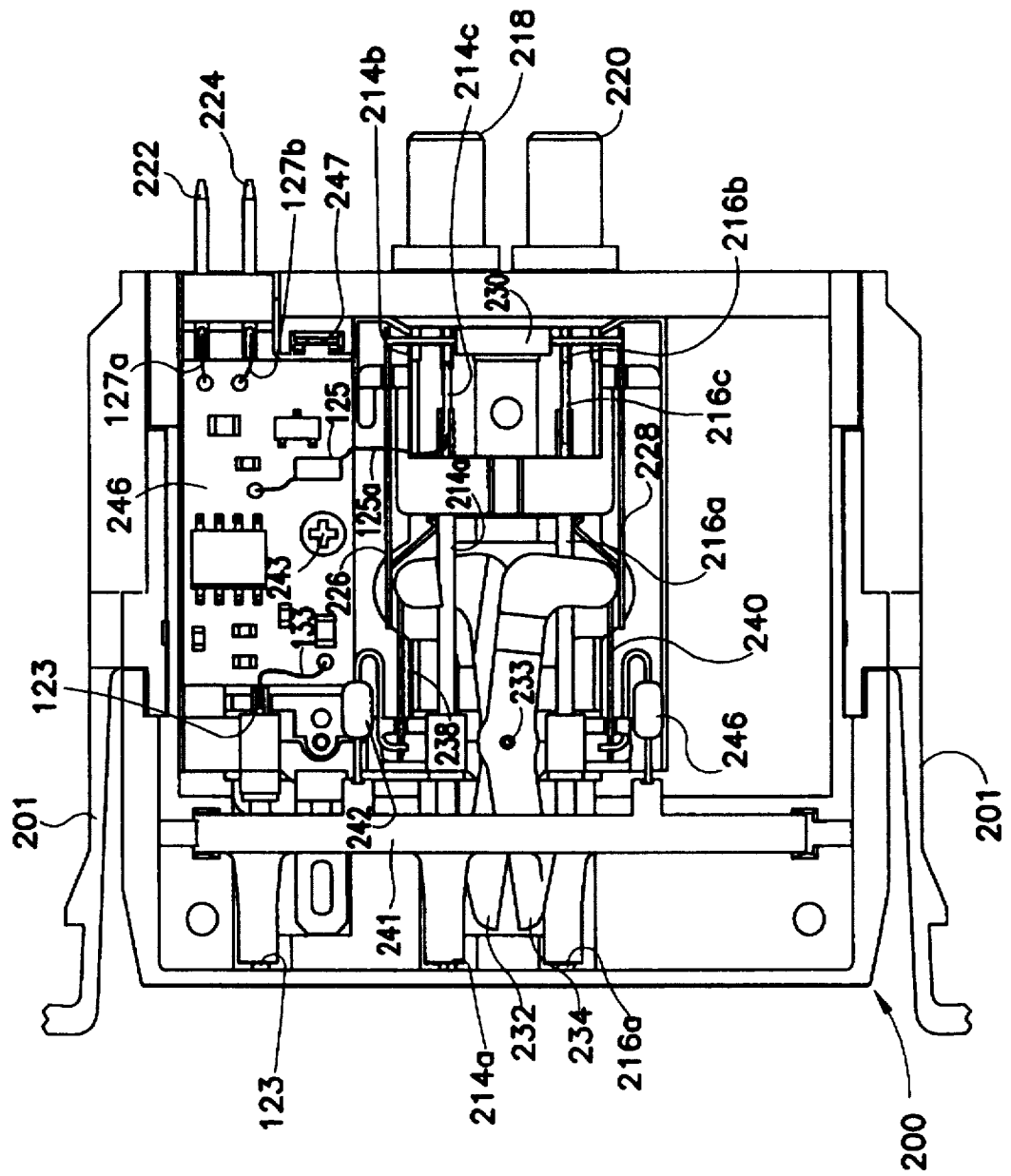
FIG. 8 is a top plan view of the switching coax jack of FIG. 7 with a cover removed.
Figure 9:
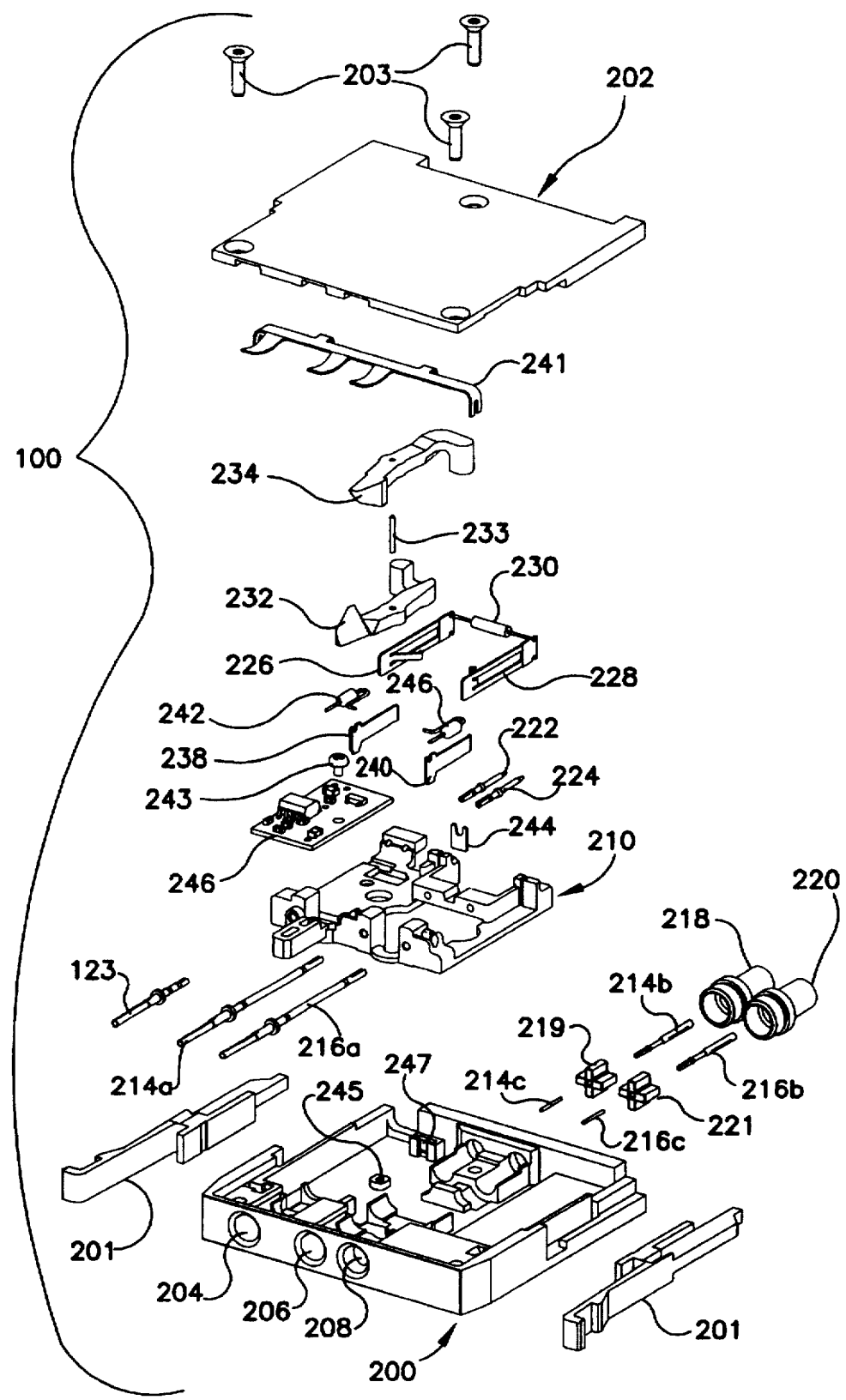
FIG. 9 is an exploded view of the jack of FIG. 7.

With reference to FIGS. 7–9, a switching coax jack 100 is shown having a housing and configuration similar to that shown as jack 10 in FIG. 3 of commonly assigned and copending U.S. patent application Ser. No. 08/252,067 (also shown in related International Application PCT/US92/05880, International Publication No. WO93/20600 published Oct. 14, 1993) and jack 10 in U.S. Pat. No. 5,413,494, both incorporated herein by reference. The jack 100 includes an electrically conductive diecast housing 200 having a cover 202 for enclosing the housing 200. Cover 202 is secured to housing 200 by screws 203. The housing 200 presents three forward ports including a monitor port 204, an OUT port 206 and an IN port 208. Clips 201 are provided to secure the housing 200 to a chassis (not shown) containing a plurality of jacks 100.

A dielectric support 210 is provided to be placed within the housing 200. The dielectric support 210 maintains various electrical components in proper alignment within the housing 200 but in spaced alignment relative to the housing 200 which is electrically grounded.

Carried on the support 210 are a monitor conductor 123, an OUT conductor 120 (shown schematically in FIG. 6 as conductor 120 and in FIGS. 8 and 9 as consisting of front and rear segments 214a,214b joined by inductor 214c) and an IN conductor 121 (shown schematically in FIG. 6 as conductor 121 and in FIGS. 8 and 9 as consisting of front and rear segments 216a,216b joined by inductor 216c). The conductors 123,120 and 121 are aligned with the monitor, OUT and IN ports 204,206,208, respectively. Rear segments 214b,216b are disposed within connectors 218,220 exposed on the rear of the housing 200. Insulative supports 219,221 support conductors 214b,216b within connectors 218,220.

The support 210 also contains two conductors 222,224 exposed through the rear of the housing for electrical connection to an external source of power (not shown). The jack 100 further includes a switching circuit (shown schematically in FIG. 6 as 122) including normal springs 226, 228 for having normal electrical contact with the OUT and IN conductors forward segments 214a,216a and with the normal springs 226,228 electrically connected by an inductor 230. The inductor 230 and normal springs 226,228 are selected for the jack 100 to have a desired impedance as is taught in the aforementioned International Publication No. WO93/20600 and U.S. Pat. No. 5,413,494.

Cams 232,234 are provided pivotally mounted within the housing 200 on a pivot pin 233 and aligned with ground springs 238,240. Ground springs 238,240 are connected across resistors 242,246 to the electrically grounded housing 200. Insertion of a plug into the OUT port 206 causes the cam 232 to act against the ground spring 238 to engage and push the normal spring 226 out of electrical connection with the OUT conductor 214a and into grounded contact with the spring 238. Similarly, insertion of a plug into the IN port 208 causes the cam 234 to rotate urging the spring 228 away from the IN conductor 216a. A ground clip 241 spans ports 204,206,208 to ground the external surface of a plug inserted within the ports.

It will be appreciated that the structure thus described forms no part of this invention per se and is illustrated solely for the purposes of providing an understanding of the present invention. Jacks having conductors and switching circuits thus described are disclosed in the aforementioned commonly assigned International Publication No. WO93/20600. In that document, pins similar to conductors 222,224 (i.e., pins 52,53 in FIG. 3 of International Publication No. WO93/20600) are shown to complete a tracing circuit when a jack plug is inserted in a monitor port. Similar pins are shown in FIG. 3 of U.S. Pat. No. 5,413,494 as items 70,72.

The novel jack 100 further includes an amplification circuit 124 on circuit board 246 supported by the support 210 and contained within the housing 200. A screw 243 passes through board 246 and is received in bore 245 of housing 200 to provide an electrical ground for the circuit board 246. Alternatively (or additionally), a ground clip 244 received within pocket 247 is provided to permit optional connection of a wire (not shown) from the printed circuit board 246 to the housing 200 to establish a ground path between the circuit board 246 and the housing 200.

Figure 10:
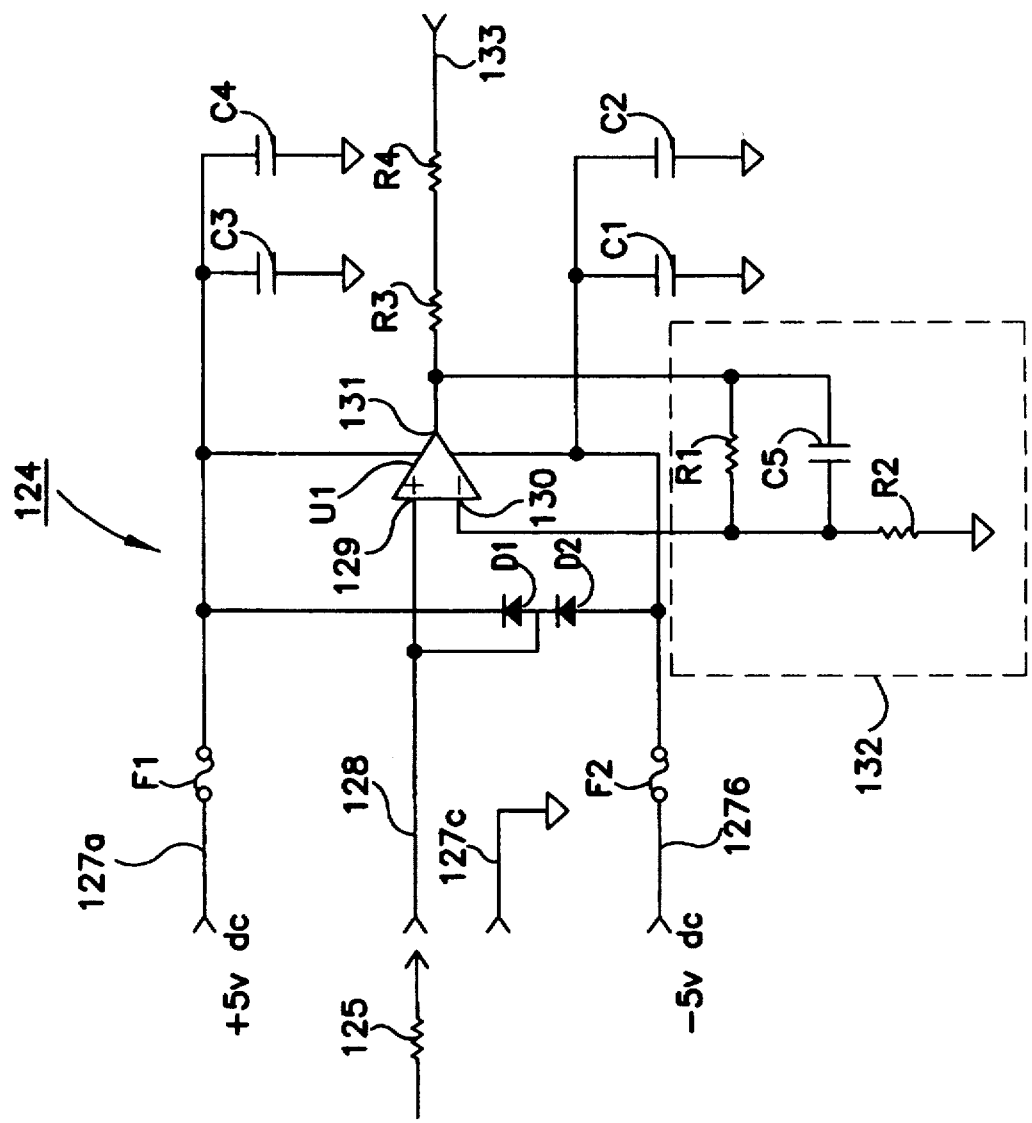
FIG. 10 is an electrical schematic view of an amplification circuit for use in the present invention.

The amplification circuit 124 is shown in electrical schematic in FIG. 10 and is connected to the OUT conductor 214a across a resistor 125. Further, the monitor conductor 212 is connected to the amplification circuit 124 as are the power conductors 222,224.

The resistor 125 is selected for a combined impedance of circuit 124 and resistor 125 to have an insubstantial draw of signal from the OUT conductor 214a so that power across the OUT conductor from connector 218 to the OUT port 206 is not substantially reduced by reason of the amplification circuit 124. By insubstantial, it is meant a power drop of less than −10 milli dB. In a preferred embodiment, the resistor 125 is selected to be 500 ohms.

Power is supplied to the amplification circuit 124 via current flow paths 127a,127b, and 127c. In the preferred embodiment, current flow path 127a (connected to conductor pin 222) provides +5 volts dc to an operational amplifier U1 through fuse F1, current flow path 127b (connected to conductor pin 224) provides −5 volts dc to the operational amplifier U1 through fuse F2, and current flow path 127c is grounded (i.e., by connection to ground screw 243). The incoming power on signal flow paths 127a and 127b is fused by the fuses F1 and F2, preferably at 0.2 Amps. The signal flow path 127a is connected to ground through filtering capacitors C3 and C4 and signal flow path 127b is connected to ground through filtering capacitors C1 and C2. The capacitors C1 through C4 and the resistance of the fuses F1 and F2 filter the power carried by signal flow paths 127a and 127b. In the preferred embodiment, capacitors C1 and C3 are 2.2 μF, forming a low pass filter, and capacitors C2 and C4 are 0.01 μF for high frequency decoupling. It will be apparent to those in the art that any type of power source can be used to provide power to the amplification circuit 124, such as, for example, wall outlets or a 48 volt battery power supply, provided a power converter converts the power to the appropriate +/−5 volts.

The operational amplifier U1 is configured as a noninverting gain stage, which is known in the art. In the preferred embodiment, the operational amplifier U1 is product number AD818, manufactured by Analog Devices, Inc. located in Norwood, Mass. The input signal drawn from the conductor 214a (on wire 125a in FIG. 8) through resistor 125 flows through a signal flow path 128 to a noninverting input 129 of the amplifier U1. A pair of diodes D1 and D2 are connected between the power signal flow paths 127a and 127b and the input signal flow path 128. The diodes D1 and D2 protect the amplification circuit 124 from over voltage, which is understood in the art. An inverting input 130 of the amplifier U1 is connected to a feedback network 132. The feedback network 132 connects the inverting input 130 to ground through resistor R2 and to an amplifier output 131 of amplifier U1 through capacitor C5 and resistor R1. At low frequencies, the configuration of the operational amplifier U1 and the resistors R1 and R2 results in a gain of 2 when the resistors R1 and R2 are equal in value. In the preferred embodiment the resistors R1 and R2 are 1000 ohms, but other resistive values could be effectively used. The gain may vary by a small amount depending upon the resistors. The capacitor C5 in the feedback network 132 is used to flatten the gain curve and increase stability, such that the circuit does not oscillate. Finally, the operational amplifier output 131 is connected to output signal flow path 133 (connected to monitor conductor 123) through resistors R3 and R4 connected in series. In the preferred embodiment, the resistors R3 and R4 provide 74.8 ohms output impedance to match a 75 ohm coax cable. The resistors R3 and R4 in series operate as a voltage divider, and thus the output gain of 2 from the operational amplifier U1 is divided by 2. Therefore, the desired result in the preferred embodiment, zero dB, is attained. The amplification and the bandwidth of the system can be modified by changing the resistive ratio of the values of the resistors R1 and R2 in the feedback network 132. Thus, other dB values can be attained.

While the foregoing description of amplification circuit 124 describes a preferred embodiment, it will be appreciated that the design of such circuit 124 is within the skill of the art. Modifications to the design can be made to achieve a desired dB and, more specifically, a zero dB jack 100.

With the structure thus described, each of the jacks $100_1$–$100_n$ in FIG. 3 may be a jack 100 such as that described above. The cables $11_1$–$11_n$ may be connected to connector 218 such that the signals from the cables $11_1$–$11_n$ are passed on the OUT conductors 214a of the jacks $100_1$–$100_n$. The cables $13_1$–$13_n$ are connected to connectors 220. Accordingly, with the absence of a plug in either of the OUT or IN ports 206,208, a signal flows through the jack 100 from coax cable $11_1$–$11_n$ to coax cable $13_1$–$13_n$ without interruption and without reduction in power.

A minute portion of the signal on OUT conductor 214a is drawn off to the amplification circuit 124 of each jack. The amplification circuit 124 receives power from conductors 222,224. The amplification circuit 124, in the preferred embodiment, amplifies the drawn off portion to a power level equal to a signal power level on the OUT conductor 214a. When it is desired to test the power level of the signal on any of conductors $11_1$–$11_n$ (e.g., conductor $11_2$), a plug end of a patch cord 13" may be placed within the monitor port of jack $100_2$ and connected to the test equipment 15. The test equipment 15 is now being provided with the CATV signal at a power level identical to the power level on conductors $11_2,13_2$. During the entire testing of the signal, there is no interruption of the signal being provided to the subscriber.

With the present invention, a single piece of test equipment 15 can provide power testing of the cable TV signals without the need to provide any service interruption to customers. Also, the testing can be done at any time and need not be limited to off-peak hours. Further, were it to be desired, the entire signal on cables $11_1$–$11_n$ can be routed from cables $13_1$–$13_n$ by inserting plug ends of patch cords into the OUT ports 206 of jacks $100_1$–$100_n$. Also, a new signal source can be readily connected to cables $13_1$–$13_n$ by connecting the source via a patch cord to the IN ports 208 of jacks $100_1$–$100_n$.

Having described the present invention in a preferred embodiment, it will be recognized by those skilled in the art that the present invention may be subject to modifications and equivalents which will be apparent to one skilled in the art having the benefits of the teachings of the present invention. It is intended that the present invention shall not be limited to the specific embodiment disclosed but shall include modifications and equivalents. For example, in the embodiment of FIG. 3, the amplification circuit 124 is selected for the jack 100 to have a zero dB loss between the monitor conductor 212 and the OUT conductor's forward segment 214a. The selection of a zero dB is made with the assumption that there is an insignificant loss of power on patch cord 13" This assumption is acceptable for short patch cords (i.e., less than about 50 feet). For longer patch cords (i.e., greater than 50 feet), the power loss over the patch cord is sufficient to impair the reliability of the testing on test equipment 15. However, with a known length patch cord 13", the power loss is determinable and the amplification circuit may be modified to compensate for the loss. For example, for a coax cable patch cord 13" having a length of about 100 feet, the amplification circuit 124 is selected to have a 10 dB gain between monitor conductor 212 and OUT forward segment 214a to compensate for a calculated 10 dB loss on patch cord 13". Such a modification to the amplification circuit 124 is well within the skill of the art for a person having the benefits of the teachings of the present invention.

What is claimed is:

1. In a signal transmission network having signals carried from a plurality of sources connected to individual ones of a first plurality of coaxial cables, a non-invasive testing system comprising:

A. a plurality of jacks each having:
1. a jack module housing;
2. at least a first central conductor disposed within said housing and having means for connection of opposite first and second ends of said first central conductor to external coax conductors with said first central conductor carrying a main signal having a power level between said opposite ends, said means including at least a first port formed through said housing for receiving a jack plug at said first end and said means further including a coax connector at said second end;
3. a monitor conductor disposed within said housing with means for connection of said monitor conductor to an external coax conductor;
4. a monitor circuit for connecting said monitor conductor to said first central conductor at a point intermediate said opposite ends;
5. at least one power conductor contained within said housing with means for connection of said power conductor to an external source of electric power;
6. said monitor circuit connected to said first central conductor across a resistive load selected to draw a portion of said main signal on said first central conductor to said monitor circuit without substantial reduction in said power level of said main signal on said first central conductor;

B. said individual ones of said first plurality of coaxial cables electrically connected to individual ones of said first ends of said first central conductors of said plurality of jacks;

C. a second plurality of coaxial cables electrically connected to individual ones of said second ends of said first central conductors of said plurality of jacks;

D. a test equipment for testing a signal on a selected one of said first plurality of coaxial cables;

E. a patch cable for selectively connecting said test equipment to an individual one of said monitor conductors of said plurality of jacks; and F. said monitor circuit including amplification means for receiving said portion of said main signal and amplifying said portion to a power selected for a power at said test equipment to equal a power on said first central conductor and delivering said amplified signal to said monitor conductor, said amplifying means connected to said power conductor.

2. A testing system according to claim 1 wherein each of said jacks further includes a second central conductor contained within said housing and having means at a first end thereof for connection to an external coax conductor;

a switching circuit contained within said housing with switch means for establishing an electrical connection between said first and second central conductors in an absence of said plug within said port and for opening said electrical connection upon insertion of said plug within said port;

said individual ones of said second plurality of coaxial cable connected to said individual ones of said second ends of said first central conductors by electrically connecting said individual ones of said second plurality of coaxial cables to individual ones of said first ends of said second central conductors of said plurality of jacks.

* * * * *

UNITED STATES PATENT AND TRADEMARK OFFICE
CERTIFICATE OF CORRECTION

PATENT NO. : 5,594,347
DATED : January 14, 1997
INVENTOR(S) : Louwagie et al.

It is certified that error appears in the above-indentified patent and that said Letters Patent is hereby corrected as shown below:

```
    In Claim 1, Column 8, line 54, cancel "first" and insert

---second--- and in line 56, cancel "second" and insert

---first---.
```

Signed and Sealed this

Nineteenth Day of August, 1997

*Attest:*

BRUCE LEHMAN

*Attesting Officer*          *Commissioner of Patents and Trademarks*